3,027,378
METHOD OF PREPARING N⁴,N⁴'-ALKYLENE-N¹, N¹'-ALKYLENE-BIS - 4 - AMINOQUINALDINIUM-DIHALIDES AND RESULTANT PRODUCTS
Hans Carl Stark, See Strasse 29, Konstanz (Bodensee), Germany
No Drawing. Filed June 22, 1960, Ser. No. 37,839
Claims priority, application Germany June 26, 1959
4 Claims. (Cl. 260—286)

The present invention relates to novel compounds and to methods for their preparation. The compounds are N⁴,N⁴'-alkylene-N¹,N¹'-alkylene-bis - 4 - aminoquinaldinium-dihalides of the formula

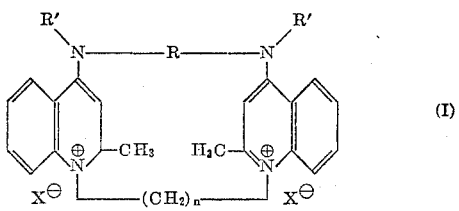

in which R is an alkylene radical, either straight or branched and having about 4 to 12 carbon atoms in the straight chain, and, for example, up to about 4 carbon atoms in the branched chain, if any; R' is hydrogen or lower alkyl, for example an alkyl having about 1 to 5 carbon atoms; $n$ is a whole number of from about 4 to 12, and X is halogen, preferably the chloride or bromide.

Particular compounds embraced by the Formula I are the N⁴,N⁴'-decamethylene - N¹,N¹' - decamethylene-bis-4-aminoquinaldinium dichloride and the dibromide.

The invention provides alternate procedures for preparation of the compounds. The preparation can involve either forming the N⁴,N⁴- bridge between quinaldine and then the N¹,N¹' bridge; or can involve using an N¹,N¹'-alkylene-bis-aminoquinaldinium-dihalide as the starting material and treating it to form the N⁴,N⁴' bridge.

According to the former method, in which the N⁴,N⁴' bridge and then the N¹,N¹' bridge is formed, 4-aminoquinaldine of the formula

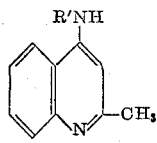

wherein R' is as above, is contacted with an α,ω-dihalogen alkane of the formula X—R—X wherein R and X are as above, for a time and at a temperature suitable for the formation of the corresponding N⁴,N⁴'-alkylene-bis-4-aminoquinaldine. The bis - 4 - aminoquinalidine is then contacted with an α,ω-dihalogen alkane of the formula X(CH₂)ₙX wherein X and $n$ are as above, for a time and at a temperature sufficient for formation of a cyclic compound according to Formula I.

According to the procedure wherein the starting material is N¹,N¹'-alkylene-bis-4-aminoquinaldinium-dihalide, this starting material is contacted and α,ω-dihalogen alkane of the formula X—R—X wherein R and X are as above for a time and at a temperature sufficient for the formation of a compound according to Formula I, above.

It is also possible to start from 4-halogenquinaldinium and to react this with diaminoalkanes to form N⁴,N⁴'-alkylene-bis-quinaldinium compounds as has been described in Examples 4 and 5.

The invention is further described in the folowing examples. In the examples the starting materials and methods for their preparation are known.

EXAMPLE 1

Preparation of N⁴,N⁴'-Decamethylene-N¹,N¹'-Decamethylene-Bis-4-Aminoquinaldinium Dibromide 33 grams of 4-aminoquinaldinium-lithium are formed into a suspension in 300 ml. of xylene and 15 grams of 1,10-decamethylene dibromide are added, followed by heating for 70 hours at the boiling point. After this time, the reaction solution is concentrated and the remaining solid cake is washed repeatedly with water. The residue is dried in a vacuum desiccator at 50 to 60° C. and then dissolved in 1 liter of dimethylformamide. 15 grams of 1,10-decamethylene-dibromide are added with agitation to the solution and the reaction mixture is heated for 120 hours at 90 to 100° C. A yellow precipitate deposits already during the course of the reaction. The reaction material is allowed to cool off, the crystalline product is carefully separated from the solvent, and washed repeatedly with ether. The compound is obtained in the form of fine yellowish crystals.

EXAMPLE 2

Preparation of N⁴,N⁴'-Decamethylene-N¹,N¹'-Decamethylene-Bis-4-Aminoquinaldinium Dibromide 10 grams of N¹,N¹'-decamethylene-bis-4-aminoquinaldinium dichloride are dissolved in 100 ml. dimethylformamide. 3 grams of sodium iodide are added to the solution and 6 grams of 1,10-dibromodecane are added drop by drop with agitation. After the addition, the reaction mixture is heated for 2 hours at 60 to 80° C. Upon cooling, the compound crystallizes out in the form of weakly yellow colored small crystals. The crystalline paste is suction filtered, repeatedly washed with ether and thereupon dried in a vacuum desiccator. The compound does not have a sharp melting point, but starts to darken above 220° C.

EXAMPLE 3

Preparation of N⁴,N⁴'-Decamethylene-N¹,N¹'-Decamethylene-Bis-4-Amino-Quinaldinium Dibromide
(R=(CH₂)₁₀; n=10)

To 4.99 grams N¹,N¹'-decamethylene-bis-amino-quinaldinium dichloride dissolved in 30 ml. dimethyl formamide, there are carefully added, drop by drop, 3.0 grams of 1,10-dibromodecane, with continuous agitation and at a temperature of 20 to 25° C. After the addition is complete, the solution is heated for 3 hours at 60° C. Upon cooling, the dibromide crystallizes out in yellowish-brown crystals. The crystals are removed by suction filtering and repeatedly washed with ether and then dried in a desiccator.

The compounds prepared in accordance with the invention are characterized by excellent chemotherapeutic properties. They have a surprisingly board spectrum of activity with respect to gram-positive and gram-negative bacteria and with respect to all important pathogenic fungi. In addition to these excellent properties, the compounds are characterized by an exceptionally low toxicity. The local compatibility of the substance was tested with mice and rabbits. A 0.01% solution does not produce any effect in a rabbit's eye when being instilled daily for two weeks.

Further, the addition of serum to the compounds does not substantially affect their activity. Also the antibacterial efficacy is very considerably reduced by intestinal juices, in particular, bile. Thus, an adverse effect on the physiological intestinal flora need not be feared in therapeutical use.

The compounds are useful to combat infections of animals and also in human therapy. According to former clinical experience the substance had an excellent therapeutical effect, in particular in the case of pyococcus infections of the skin, impetigo contagiosa and staphylococcus infections of new-born babies. Moreover, good success was attained when treating foot mycoses and other mycotic dermatoses.

As individual indications, there can be mentioned: infected eczema, intertrigo (also by moniliasis), sycosis of the beard, impetigo contagiosa, otitis externa, pyoderma, folliculitis, furuncles, trichophytosis, epidermophytosis, superinfected mycosis, eczematoid dermatitis (infectious), herpes-simplex infections, tonsillitides, pharyngitides, laryngitides, stomatitides, aphthae (thrush), stomacatis, lingua nigra, gingivitis, and alveolitis.

The compounds can be combined with inert carriers such as are well known in the art, e.g. talc. It can be prepared in the form of creams, liquids and pastilles. A unit dose can be about 0.25 to 3 mg.

Turning now to some details of the procedures according to the invention, inert solvent can be employed as the reaction medium. Solvents suitable for this reaction are aliphatic acid amides such as formamide or di-methylformamide. The solvents employed in the examples are also well suited. Conditions of temperature and pressure are not critical. Atmospheric pressure can be used. Preferred temperatures are indicated in the examples, as are also the corresponding reaction times. Further, proportions are not critical, and those indicated in the examples are well suited to the purposes of the invention. Alkali metal iodide, e.g. sodium iodide provides improved results in terms of yield. It can be used to this advantage in each step of the procedure wherein the starting material is the amino-quinaldine (Example 1), or it can be included in the reaction medium of the procedure wherein the starting material is the $N^1,N^{1'}$-bis-quinaldinium derivative (Examples 2 and 3). A small amount, effective to realize the mentioned purpose, can be used. Up to about the amount used in Example 2 is appropriate. Larger amounts can be used, but in general no significant benefit will be realized from use of larger amounts.

While particular embodiments of the invention have been described, various alternatives and modifications will occur to those skilled in the art, and it is desired to secure by these letters patent all such variations as are within the scope of the appended claims.

EXAMPLE 4

*Preparation of N,N'-Bis-(2-Methyl-Quinolyl-(4)-) 1,10-Diaminodecane*

In a 250 ml. flask, 130 grams of phenol are molten, 26 grams of anhydrous 4-chlorquinaldinium and 13 grams of 1,10-diaminodecane are added and, while being refluxed, heated for 5 hours at 180 to 182° C.

After a night's rest the semi-liquid reaction mixture is treated with about from 600 to 800 ml. of ether, with the dihydrochloride of the reaction mixture precipitating in oily form and then becoming quickly solid. It is sucked off on a suction filter, thoroughly washed with ether to remove the phenol and dried in a vacuum desiccator. Yield: 48 grams.

Subsequently, this substance is dissolved in hot methanol, the solution is made alkaline with the aid of concentrated caustic soda and put into a freezing mixture of ice and common salt.

When cooling, the base crystallizes, is then suction filtered, washed with distilled water and acetone and dried in the vacuum desiccator.

Yield: 25 grams (=75% of the theory) Fp=182–185° C.

EXAMPLE 5

*Preparation of $N^1,N^{1'}$-Decamethylene-$N^4,N^{4'}$-Decamethylene-Bis-4-Amino-Quinaldinium-Diiodide*

4.5 grams of N,N'-bis-(2-methyl-quinolyl-(4) 1,10-diaminodecane and 3.9 grams of 1,10-diiodide decane are dissolved in 125 ml. of hot n-butyl alcohol and heated at boiling temperature for 30 hours, while being stirred and refluxed. Then the solution is cooled, the precipitated yellow substance is sucked on a suction filter, thoroughly washed with acetone and dried in the vacuum desiccator.

Yield: 4 grams.

In the ring closure reaction of Examples 4 and 5 aromatic or aliphatic alcohols are used as inert solvents, with the boiling being effected under reflux. The reaction temperature may be influenced in the desired way by the choice of the solvent. A high reaction temperature is attained especially by using the aromatic alcohol, i.e. phenol.

What is claimed is:

1. $N^4,N^{4'}$-alkylene-$N^1,N^{1'}$ - alkylene - bis - 4 - aminoquinaldinium-dihalides of the formula

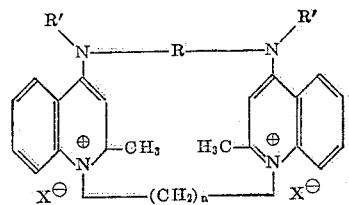

in which R is selected from the group consisting of straight and branched chain alkylene having 4 to 12 carbon atoms in the straight chain, R' is selected from the group consisting of hydrogen and lower alkyl, n is a whole number of from 4 to 12, and X is halogen.

2. $N^4,N^{4'}$-decamethylene-$N^1,N^{1'}$ - decamethylene - bis-4-aminoquinaldinium dichloride.

3. $N^4,N^{4'}$-decamethylene-$N^1,N^{1'}$ - decamethylene - bis-4-aminoquinaldinium dibromide.

4. A process of producing $N^4,N^{4'}$-alkylene-$N^1,N^{1'}$-alkylene-bis-4-aminoquinaldinium compounds according to the formula

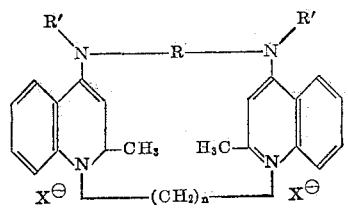

in which R is selected from the group consisting of straight and branched chain alkylene radicals having about 4 to 12 carbon atoms in the straight chain, R' is selected from the group consisting of hydrogen and lower alkyl radicals, n is a whole number of from 4 to 12, and X is halogen, comprising the reaction of 4-halogenquinaldinium with α,ω-diaminoalkanes having the general formula R'—NH—R—NH—R', wherein R and R' are as above and the cyclization of the obtained $N^4,N^{4'}$-bis-quinaldinium compounds with α,ω-dihalogen alkanes.

References Cited in the file of this patent

UNITED STATES PATENTS 2,791,582    Austin et al.    Mar. 7, 1957
2,901,484    Schock    Aug. 25, 1959

OTHER REFERENCES

Hartwell et al.: J. American Chemical Society, vol. 72, pages 2040–2044 (1950).